Patented Dec. 27, 1949

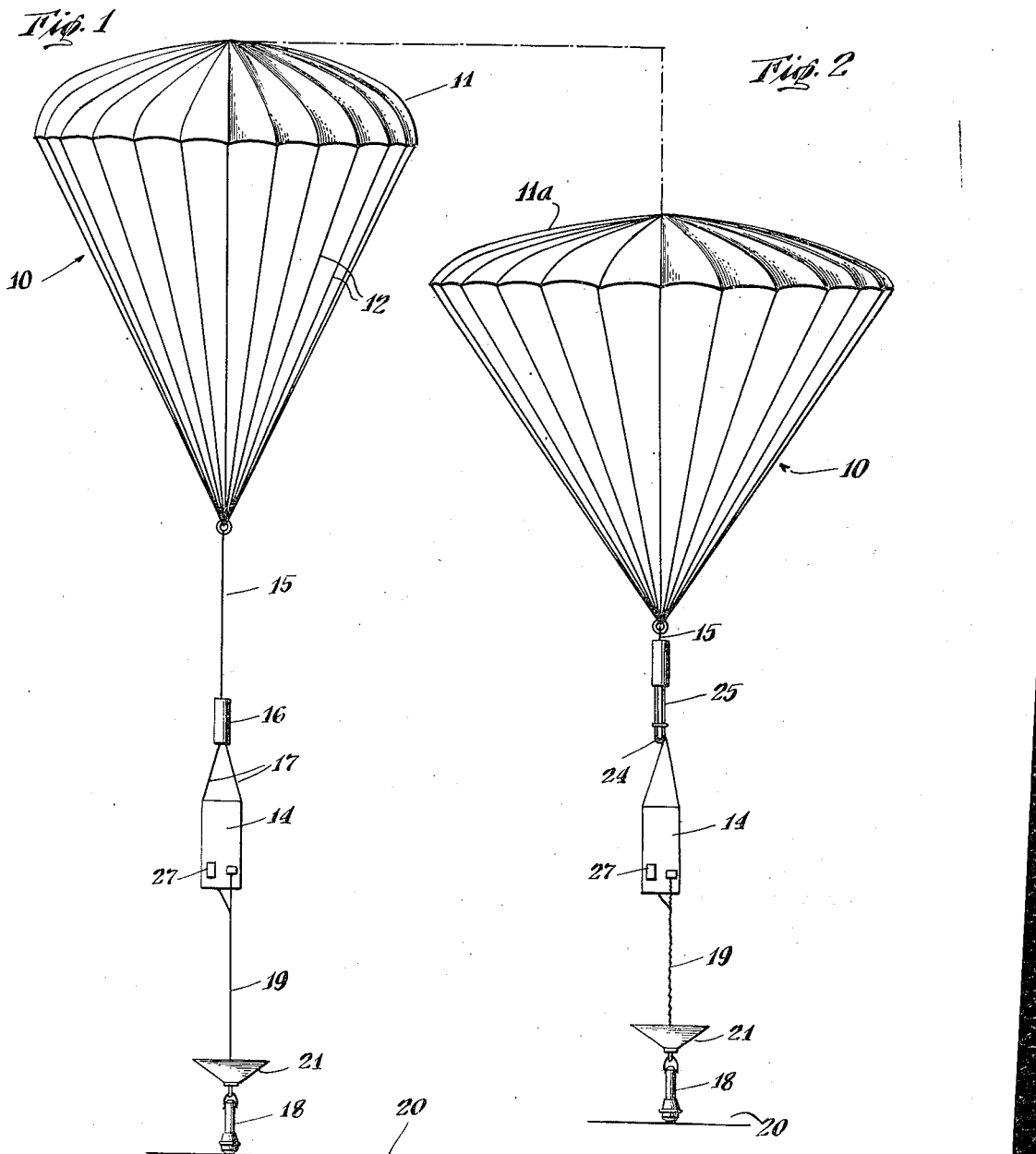

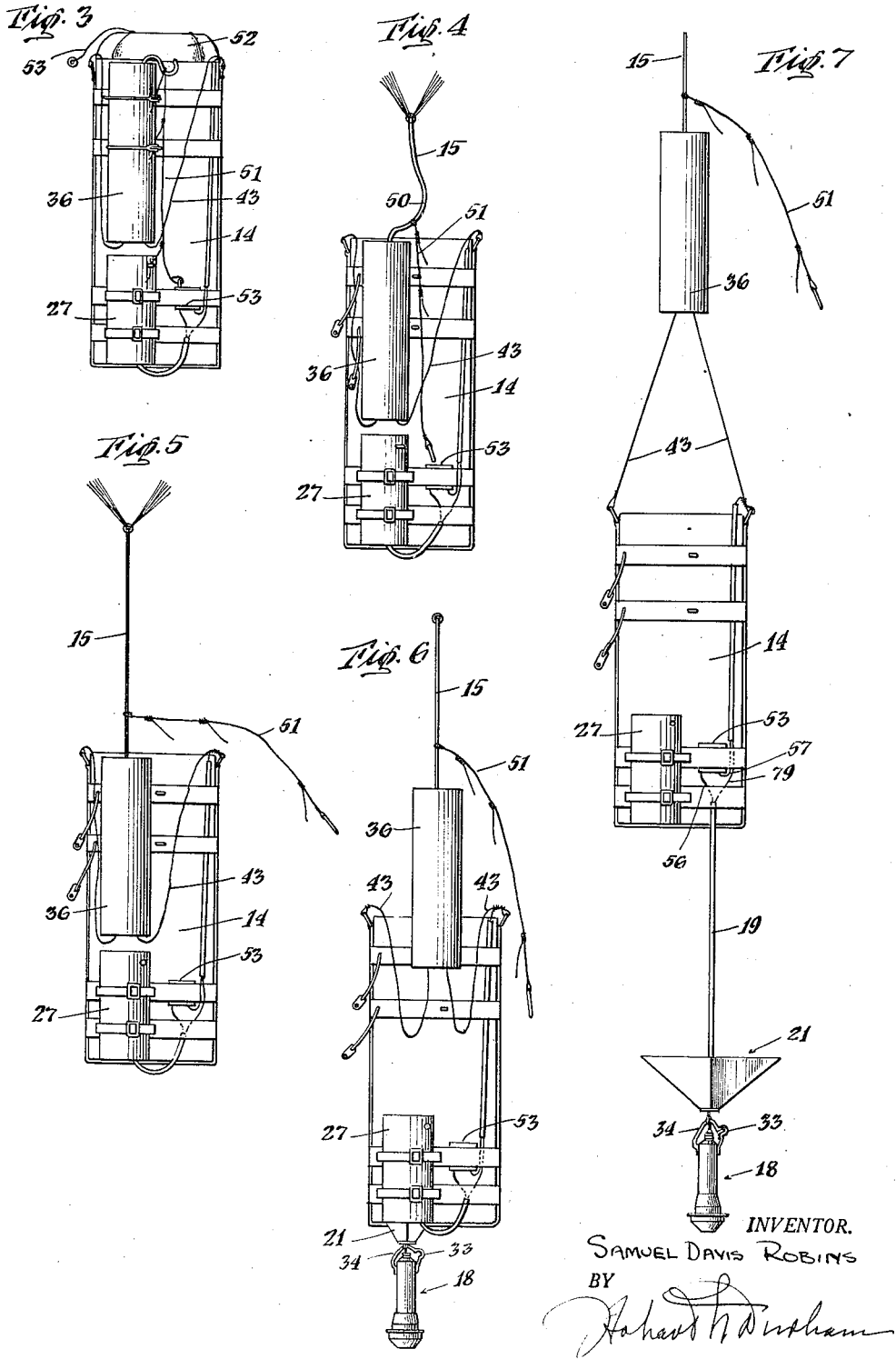

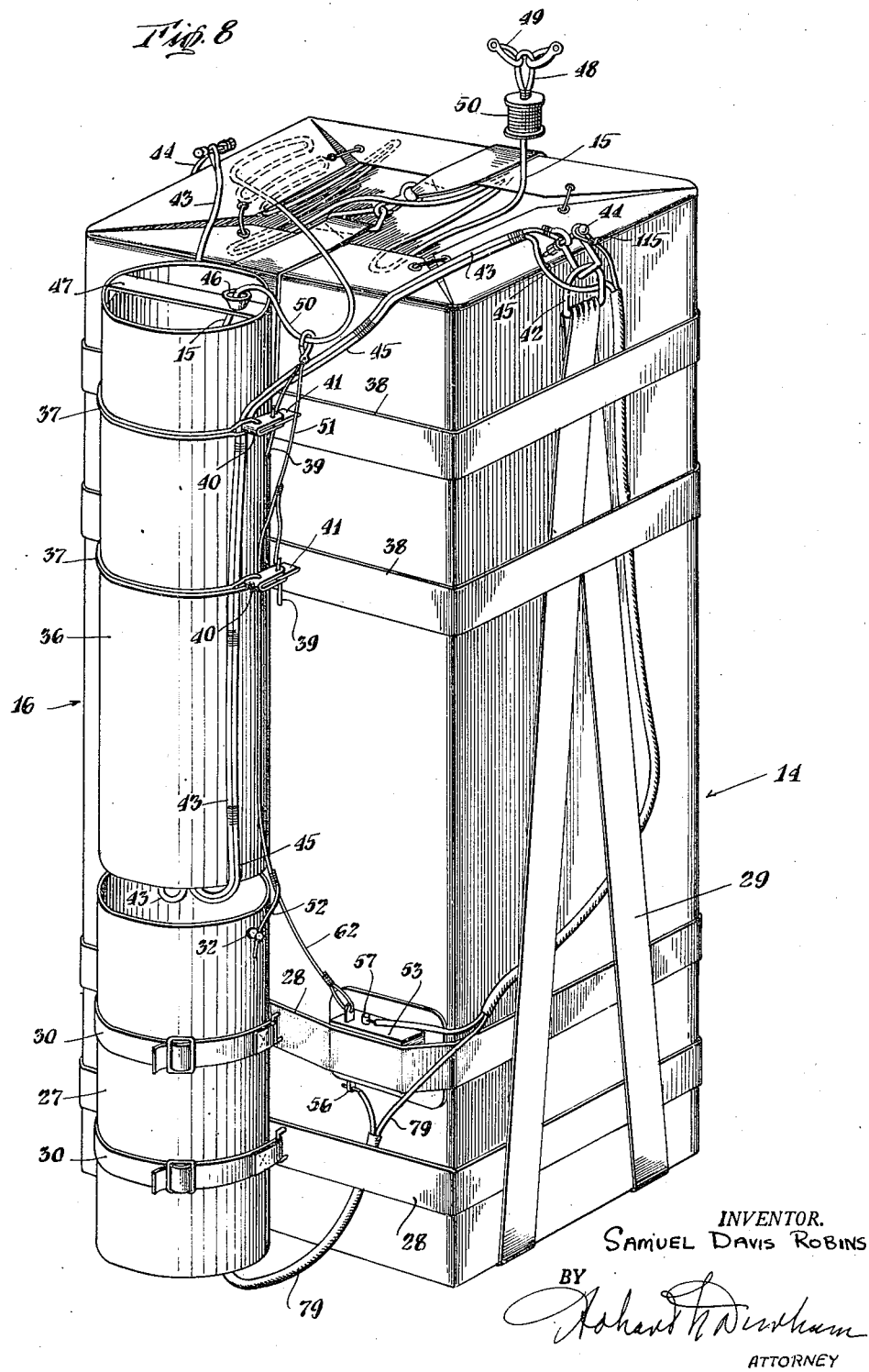

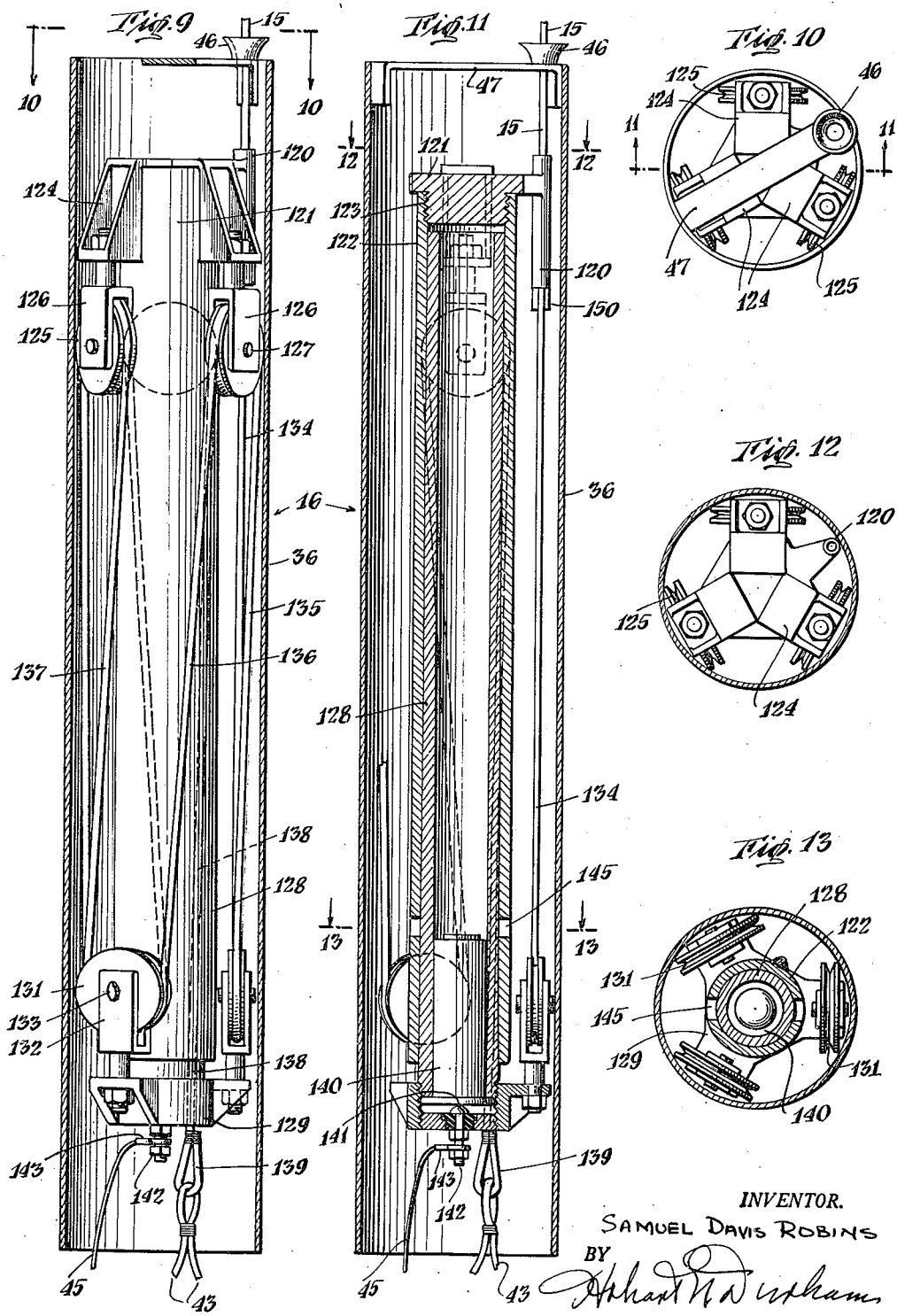

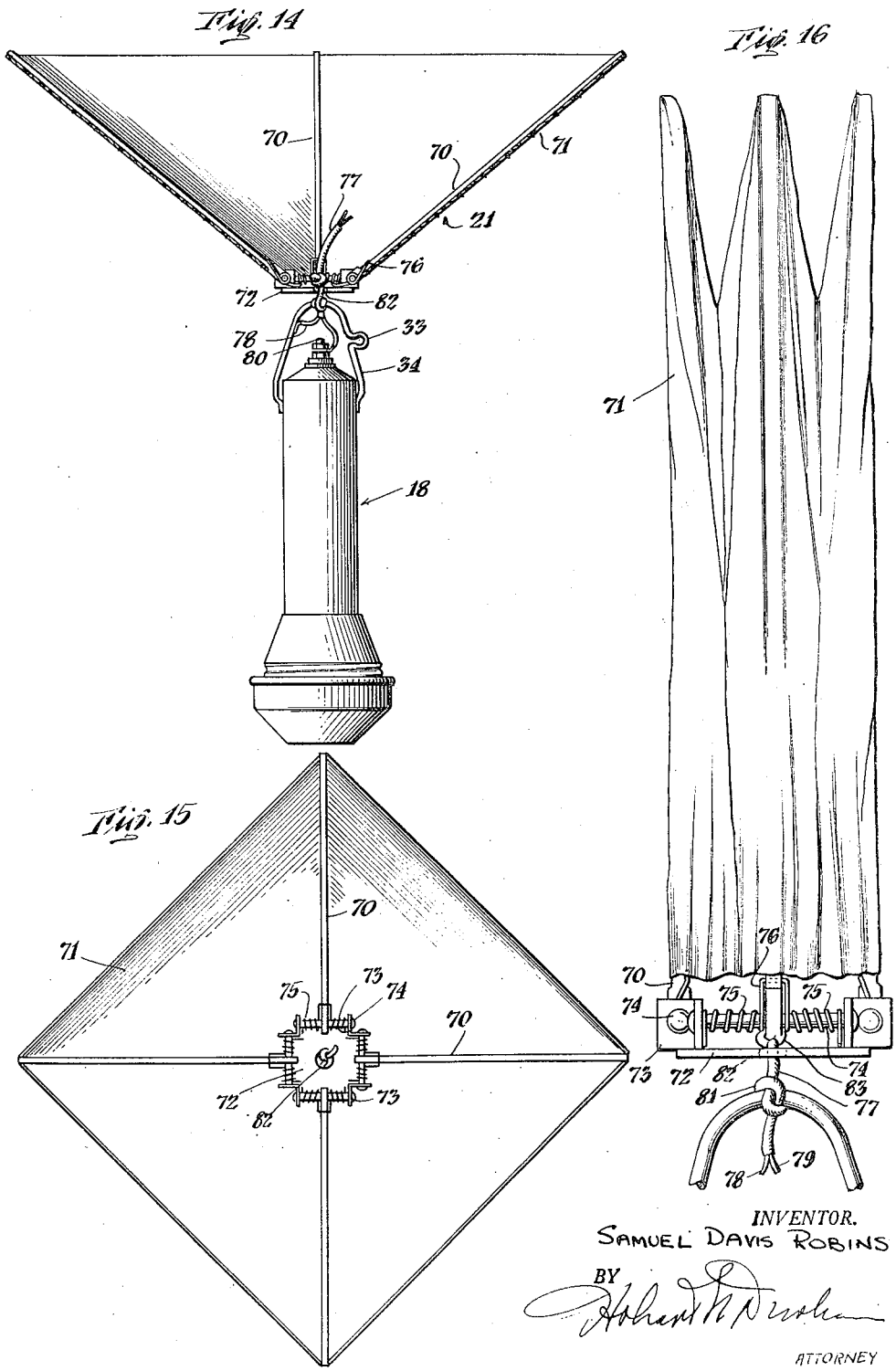

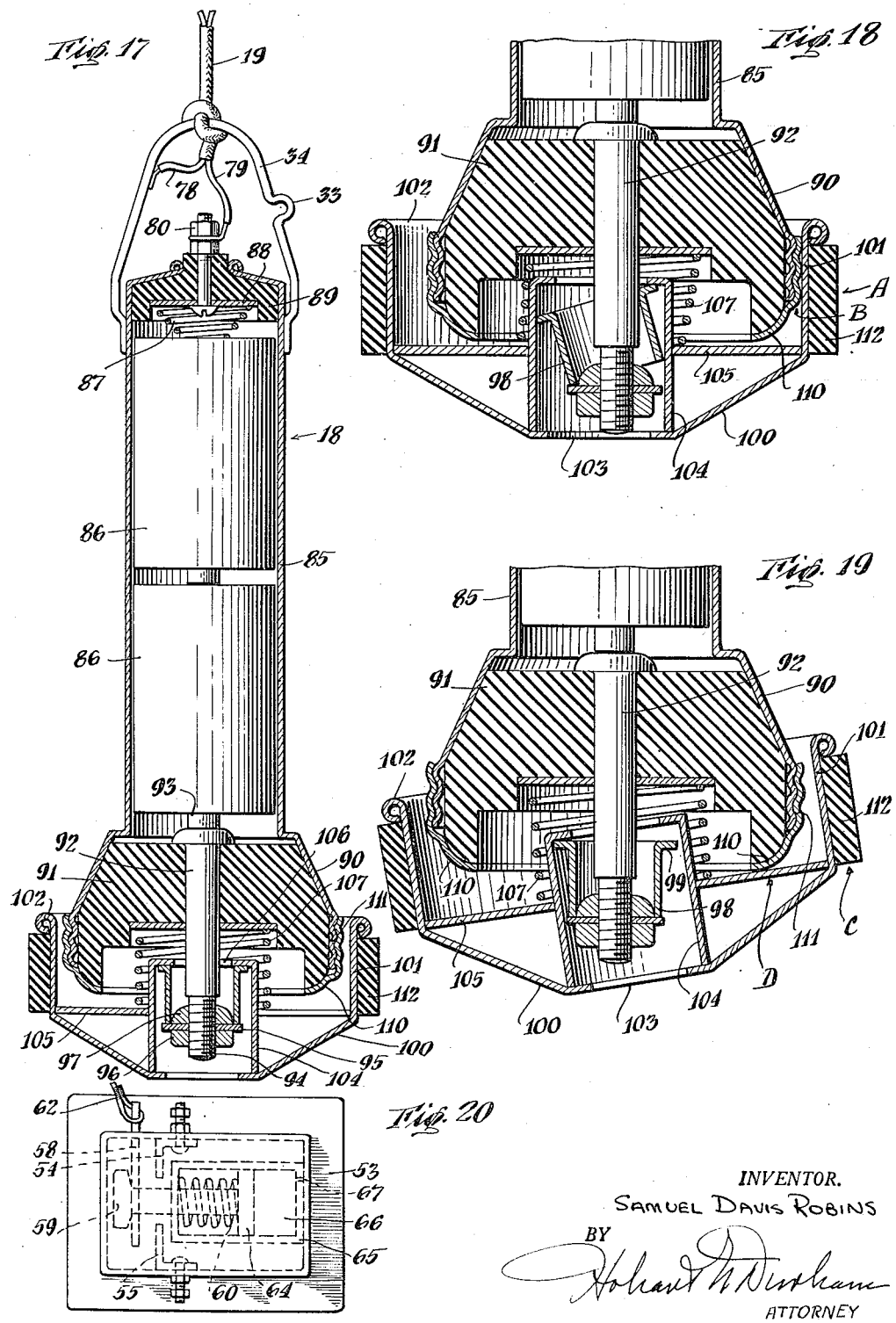

2,492,501

UNITED STATES PATENT OFFICE 2,492,501

MEANS FOR ARRESTING DESCENT OF A PARACHUTE SUPPORTED LOAD

Samuel Davis Robins, New York, N. Y., assignor to Hopkinson Laboratories, Inc., New York, N. Y., a corporation of New York Application January 27, 1945, Serial No. 574,926

14 Claims. (Cl. 244—138)

1

This invention relates to means and methods for controlling the speed of descent of a parachute supported load and more particularly for causing a parachute supported load to check or brake its speed of descent at a selected point in its downward path and preferably to perform landing of the load at relatively zero velocity.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate embodiments of the invention, and together with the description, serve to explain the principles of the invention.

Of the drawings:

Figure 1 is an elevation of a parachute and a load supported thereby having attached therebetween means according to one embodiment of the present invention for performing the control of speed of descent of the load, the parts including the parachute and load being in a position normally occupied during the descent of the load at normal speed;

Figure 2 is a view similar to Figure 1 showing the parachute load and means defined, in a position assumed just after said means have operated to perform their function;

Figures 3, 4, 5, 6 and 7 are views of the means according to the present invention for performing the function defined, showing said means progressively in positions assumed after launching of the parachute and during descent;

Figure 8 is an isometric illustration of the load to be supported by a parachute, having one embodiment of the means according to the present invention attached thereto, the position of said means being as assumed before the load is attached to a suitable parachute and before launching of the parachute supported load;

Figure 9 is a cross-sectional view through the protecting casing of part of the means according to one embodiment of the invention for performing the function defined;

Figure 10 is a top view of the device of Figure 9 on the line 10—10 of Figure 9;

Figure 11 is a cross section on the line 11—11 of Figure 10;

2

Figure 12 is a cross-section on the line 12—12 of Figure 11;

Figure 13 is a cross-section through the device of Figure 9 taken on the line 13—13 of Figure 11;

Figure 14 is a view, partly in section, of another operating part of the means according to an embodiment of the present invention for performing the function defined, as shown in load descending position;

Figure 15 is a plan view of the device of Figure 14;

Figure 16 is a view of part of the device of Figure 14, but in a position prior to launching the parachute supported load;

Figure 17 is a sectional view of another part of the means illustrated in Figure 14, shown in a neutral and non-operating position;

Figures 18 and 19 are detailed views of the device of Figure 17 in different operating positions; and, Figure 20 is a detailed view of a time switch suitable for use with the apparatus illustrated in the preceding figures of the drawings, and forming a part of the present invention.

It is a well-known practice to deliver airborne supplies of all types to the ground by means of a parachute supporting load. For many reasons it is desirable to have a fast rate of vertical descent of such parachute supported loads so that for instance the selected landing area will not be overshot by drifting and also under combat conditions to prevent the load from presenting an easy target to enemy gunfire. However, a high rate of vertical descent has presented a serious problem in the damaging of valuable cargoes forming the load due to ground impact. The rate of descent is obviously a function of the ratio between the weight of the cargo and the effective area of parachute, but even at the present usual maximum speed of twenty feet per second the impact of the load upon the ground or like receiving area is such that damage often ensues to the cargo. Furthermose, it is often desirable to increase this rate of vertical descent for many reasons including those given above, but heretofore this has presented a very great problem bearing in mind the cargo carried may weigh two hundred pounds or more so that the damaging impact becomes an increasing serious factor Furthermore, similar problems exist when the load to be supported comprises a human being with or without the additional weight of equipment.

It is, accordingly, the object of the present invention generally to provide a solution to these various problems whereby not only can the landing impact be minimized when using rates of descent for the load comparable to present practice, but also that the rate of vertical descent of the load may be increased materially if desired without the heretofore present resultant damage under such landing impact.

More specifically, it is the object of the present invention to cause the rate of descent of a parachute supported load to be arrested at a selected point in the descent to reduce the velocity to a negligible factor and desirably to substantially zero, whereby to perform landing of the cargo without substantially any impact.

Further objects of the invention are; to provide means for automatically arresting the downward descent of a parachute supported load; to provide means for causing a parachute supported load to be landed at zero velocity; to provide means for applying a power surge against the downward descent of a parachute supported load to arrest its descent; and, to provide means readily attachable to a load to be parachute supported which will automatically be arranged in the downward descent of said load when parachute supported, to cause landing of the load without substantially causing damage by impact.

Generally, in carrying out the present invention, there are provided power means associated with the load to be supported by the parachute, the power means being adapted to operate at a selected point in the descent of the parachute supported load to create a force acting on the load to counteract its velocity of descent and thereby check the downward descent of the load, preferably completely by bringing the load to a halt at said selected point but at least sufficiently to reduce the momentum of the descending load to a value whereby the rest of the descent thereof will be at negligible velocity.

The power means utilized may be of any desired form capable of creating a surge of energy at the time of operation to perform the duty specified, and there may be utilized a jet expelled compressed charge, a rocket, an explosive charge, or any like means adapted to be associated with the load to act contrary thereto during its descent for the purpose defined.

More specifically, and in accordance with a preferred embodiment of the present invention, there are provided power means adapted to be located between a load and a parachute for supporting same during vertical descent which power means are operable at a selected time, or at a selected point in the path of descent of the load, to change the distance between the load and the supporting parachute, so that the load will be deposited on the receiving landing space without material impact. In practicing this invention any form of parachute can be used, this being preferably attached to the power means and the load being attached to the power means also.

This power means may be adapted to be secured to the cargo or other load prior to attaching same to a parachute and novel means are also provided for actuating the power means, preferably automatically, after the parachute has been launched. The power means act as a descent arresting means when operated during the downward movements of the load and may be operably put into such arresting action either manually or automatically. The power supply of the power means may be of any type suitable for applying a sudden high velocity stroke to the means connecting the parachute and load, in a direction such that the parachute and load are drawn together or have their relative spacing the one from the other materially reduced.

Specifically, compressed air or other gas may be utilized for this power acting within a cylinder to force a piston to move through a predetermined stroke, in which case the piston may conveniently be connected to either the parachute or the load and the cylinder to the other, and any desired means may be provided for selecting the time or position in the descent when such power is applied to the piston. Alternatively, the power may be supplied by spring means. Preferably, however, the power for causing relative approaching movements of the parachute and load include an explosive charge adapted to operate a piston within a cylinder.

Inasmuch as it is desirable to have a relatively large stroke applied to reduce the distance between the parachute and the load, it is a preferred feature in the present invention to interconnect the piston and cylinder by multiplying means so that the size of the piston and cylinder can be kept small enough to form a compact unit with little weight compared to that of the load, and to this end, conveniently the means to multiply a relatively small piston stroke and produce a larger reducing stroke to the parachute and load may comprise a series of sheaves or pulleys adapted to accommodate a plurality of reaches of a connecting line or riser between the parachute and the load.

The means for selecting the time or alternatively the position relative to the landing area of the load at which the power means are operated to cause arresting of the load in its descent may conveniently be a dependent switch operated, for example, from an electric battery, which switch contacts the ground or other landing place prior to the actual load, being, for instance, suspended below the load on a line or cable of predetermined length, so that the arresting of the load, by the relative approaching movements of the load and parachute, is caused at such a distance above the landing area that thereafter the load will be deposited at substantially zero velocity. If desired, a suitable stabilizer for preventing oscillation of the ground switch, and accidental operation thereof by side contact with obstructions such as trees, may be provided suitably in the form of a pilot parachute or other aerodynamic damper.

A locked time switch is preferably placed in the electric circuit of the operating ground switch so arranged that upon dispatch of the parachute from the airborne carrier, the switch cannot be operated until the lock of the time switch has been released and until the interval of time has elapsed for which the time switch is set, thereby preventing operation of the power means when the parachute first bites the air and commences to open, at which time the load carried thereby is subjected to a sudden stress.

Generally, the present invention contemplates coupling a conventional parachute to a conventionally arranged cargo or human load through the medium of a device adapted to arrest or brake or nullify the descending velocity of the load at a predetermined or selected position in the downward path of the load, the device preferably having a power means operable at that selected position to provide a decelerating force which acts to reduce the distance between the parachute and the load by a definite and relatively large amount, thus arresting the load and thereafter allowing it to be generaly deposited on the ground at minimum or substantially zero velocity.

This coupling device may be of many forms but substantially comprises relatively moving parts connected to the parachute and to the load and forming the connection between these, and power means to force the parts to move relative to each other, the parts being so interconnected with the parachute and load that this movement causes rapid shrinkage of the distance between load and parachute of a large amount (such as several feet) with a minimum of force applied (such as 4 G's).

With the device of the present invention in operation, the load supported by the parachute will descend to a predetermined point above the landing place, at which time the power means will be automatically or manually actuated to cause the braking movement and preferably to cause the parachute to approach the load, and the sudden surge of energy created in a direction opposite to that of the descending load but in the same direction as that of the descending parachute is adapted to permit landing of the load without impact. By correct relationship of rate of descent, the amount of stroke of the braking movement, and the height above the landing space when the energy surge is created, it is possible to land the load at zero velocity or substantially so, since the load will continue to fall in the interval of time of application of the energy surge to the load and supporting parachute, and in that interval will reach the landing area.

It will be understood that the foregoing general description and the following detailed description as well are exemplary and explanatory of the invention but are not restrictive thereof.

Referring now, by way of example, to the embodiment specifically illustrated in the accompanying drawings, in Figure 1 there is shown a parachute 10, having a canopy 11 and shrouds 12 of conventional form. This embodiment is specifically directed to a load other than a human being. The cargo 14 is carried by the parachute through the medium of a riser 15 which is attached to the power unit 16 of the present invention, hereinafter described, from which power unit a bridle 17 extends to hold the load 14. The power unit 16, is adapted to be operated at a selected point in the downward path of the load 14 to reduce the operative length of riser 15 and thus bring the parachute 10 and the load 14 nearer together under the sudden urge of a power stroke. To operate the power of power unit 16 there is provided an electric switch 18 acting as a ground contact switch to operate the power of power unit 16, switch 18 depending below the load 14 by means of a cable 19 attached to the load 14, when the parachute supported cargo is floating to the ground or other landing area 20, as illustrated in Figure 1. In order to minimize oscillations of ground switch cable 19, there is provided an aerodynamic damper 21 in the form of a pyramidal inverted pilot chute. Oscillations of cable 19 and thus ground switch 18 would have the disadvantage of defeating the properly timed arresting operation of the power unit 16, through disturbing the calculated vertical distance between ground 20 and load 14 when switch 18 makes operative contact with ground 20. By arrangement of a desired length of cable 19, the arresting action on the load 14 of the power unit 16 can be so predetermined as to time or as to relative height of load 14 above ground 20 that the load 14 can be deposited on ground 20 at substantially zero velocity.

In Figure 2, the parts disclosed in Figure 1 are shown in the arrangement immediately following the application of the power of power unit 16 to cause a relative shrinkage of the distance between load 14 and parachute 10. The canopy of the parachute has been flattened to contour as at 11a by the downward pull on cable 15 in part caused by the power arrested in its downward movement, and if the length of cable 19 and switch 18 is, for example, eighteen feet, the cargo 14 is now momentarily hovering at substantially zero velocity eighteen feet above ground 20, and will settle to the ground due to the small amount of movement remaining.

Actually, in the form specifically illustrated in Figure 2, the slack in riser 15 due to the relative movement of parachute 10 and load 14 has been absorbed by pulleys 24 and the several reaches of the riser 15 as at 25. As hereinafter brought out, and as generally hereinbefore defined, the power operated means which are activated by contact of ground switch 18 with ground 20 generate a relatively small force, such as 4 G's for example, and due to the construction of the parts of power unit 16, and particularly the illustrated pulleys 25 for taking up the riser 15, result in a large relative movement of the parachute 10 and load 14. For instance, in the illustrated form of Figures 1 and 2, with the weight of cargo 14 at say 200 lbs., and the diameter of the canopy 11 in Figure 1 as 19 ft., the drop experienced by the parachute (shown as A on Figure 2) would be about 8 ft., and the diameter of the canopy 11a would be about 22 ft.

In the specific form of apparatus illustrated in Figures 1 and 2, therefore, power unit 16 has means therewithin actuable by ground switch 18 when it contacts ground 20, through suitable electric circuit (not shown) to apply power to the riser 15 to pull this within power unit 16, the slack of the riser being taken up by pulleys 24 as reaches 25, to draw parachute 10 down toward load 14 with a sudden surge of power, thereby arresting load 14 in its position above ground 20, as determined by the length of cable 19, and permitting the load 14 to land on ground 20 thereafter without impact. The provision of the pulleys 24 and reaches 25 permit a smaller length of unit 16 by multiplying the effected reduction of relative position of the parachute and load.

It is a feature of the present invention when the load to be ultimately carried by the parachute is a cargo, to provide means for fastening power unit 16 and switch 18 to the cargo 14 prior to attaching the cargo to the parachute, and to protect the working parts of both unit and switch from harm in such attached position, forming also a compact and simple means for attaching them to the cargo as well as providing means for automatically placing each part in operative position, as in Figure 1, when a parachute carrying this load 14 is launched. To this end, as shown particularly in Figure 8, there is provided a canister 27 attached to cross-bars 28 under sling 29 which supports the actual cargo or load 14 in usual fashion, by straps 30. Within this canister there is located the ground switch 18 and its supporting cable 19, the switch 18 being held securely within its protective canister by a pin 32 protruding through and inside of the canister 27 and engageable with an eye 33 on the bale 34 supporting casing of switch 18 (see Figures 6, 7, 14 and 17). Thus, while pin 32 is in position, switch 18 and cable 19 will remain held within canister 27 as well as damper 21 which is foldable for this purpose. Power unit 16 comprises an outside canister 36 within which the power means are housed, as hereinafter described, the canister forming a protective container for the parts of the power unit. Canister 36 is temporarily held in place on the supporting pack of cargo 14 by straps 37 embracing the canister, held at one end bonded to crossbars 38 of sling 29.

The free end of each strap 37 terminates in a U clip 40 embracing a stud 41 fast on a strap 38, each binding unit comprising the clip 40 and stud 41 being drilled to receive a pin 39, to hold the canister in place relative to straps 38 until pins 39 are removed, when the canister 36 will be free to fall away from the pack of cargo 14. Sling 29 terminates in the usual stirrups 42 from which it can be supported. The bridle supporting same, shown in Figure 1 at 17, comprises suitable cables 43 attached to shackles 44, and it will be seen in Figure 8, that cables 43 go to the lower end of canister 36 and thence inside thereof to be connected as described hereinafter to part of the power operated means. Riser 15 of Figure 1, is shown in Figure 8 in coiled form laying on top of the pack of cargo 14 and ultimately entering a canister 36 at its top through a guide 46 carried by a crossbar 47 fast to the canister. The other end of riser 15 terminates in a ring 48 to which may be ultimately attached the snap hooks 49 of a conventional supply parachute.

A rubber shock absorber 50 is carried at or below ring 48 to absorb the impact possibly caused when the power means operate to draw the parachute toward the load, at which time ring 48 may strike guide 46 and such impact is readily absorbed by shock absorber 50, which may be in the form of a rubber or like cylinder or series of rings surrounding riser 15 and held to ring 48 in any suitable manner.

In the normal manner of procedure, the cargo pack 14 within its sling 29 with the canisters 27 and 36 attached is carried within the airborne delivery means ready to be attached to a conventional parachute and, at the desired time, the snap hooks 49 of the parachute are clipped to ring 48, whereafter the parachute is projected in normal manner from the airborne delivery means for automatically opening the said parachute, as by a static line. In such instances, it is desired that the power means for causing the arresting of the load 14 in its descent at the predetermined time, shall be operatively arranged as shown in Figure 1 of the drawings, to which end, the riser 15 is provided with a bight 50, just prior to entering the guide 46 in the top of canister 36, to which is attached a lanyard 51 adapted to substantially simultaneously remove pins 39 and pin 32.

Upon dispatch of the parachute from the airborne carrier, the riser 15 becomes taut thus removing the slack from lanyard 51 and causing pins 39 to be pulled out of the securing means 40, 41 and thus freeing canister 36. Thereafter, substantially simultaneously, pin 32 is removed by its extension 52 of lanyard 51 to free the switch 18 and cable 19. Thus, the power unit 16 and switch 18 will drop and ultimately assume the positions shown in Figure 1 of the drawings.

In Figures 3, 4, 5, 6, and 7 there is shown the sequence of the above operation, the positions assumed being progressive through a small increment of time.

In Figure 3, the complete unit is shown with a folded parachute 52 thereattached, having a rip-cord 53, which would normally be attached to a static line. In Figure 4, the parachute is omitted, and the riser 15 is shown being dragged into a taut line with bight 50 straightening, thus pulling on lanyard 51. In this position it will be seen that pins 39 have been just removed and also pin 32. In Figure 5, the lanyard 51 is completely free and the riser 15 is now taut. In Figure 6, the canister 36 has been pulled upwardly with bridle 43 partly extended, while switch 18 has begun to fall by gravity from its canister 27. Finally, as in Figure 7, the switch 18 is extended fully by its cable 19, and the canister 36 containing the power means yet to be operated is extended between riser 15 and load 14 by the bridle 43. Stabilizer damper 21, shown in Figure 1, has been also displaced from canister 27. In the transition from Figure 3 to Figure 7, it is of course obvious that only a small amount of time has elapsed.

Thus, entirely by control of the gravitational pull exerted when the load coupled with a parachute is ejected from the airborne delivery means, the operating parts, according to this invention, have assumed their position for ultimate operation, as shown in Figure 1.

When utilizing this same form of compact unit for a human or similar live load, it is preferable that the canisters 27 and 36 with their operating apparatus described above shall be attached to the parachute itself and shall be operated by the opening thereof in a similar manner to that described from the rip-cord or static line 53 except that the human load shall fall free and clear of the attaching risers with the operating parts shown in Figures 1 and 2 falling into position after the human load has taken up its position of controlled descent by inflation of the parachute. With this modification, however, the final position of all operating parts of the apparatus according to the present invention will be as in Figures 1 and 2 with the load 14 then being a human being, and the minor modifications necessary are obvious when considering Figure 8.

Inasmuch as it is preferable that whatever means are utilized in the power unit 16 for performing the arresting function, be protected from a premature discharge, it is also a feature of this invention to provide a locked time switch to prevent the switch 18 from operation upon, for instance, the sudden displacement caused by the initial inflation of the parachute.

To this end, there is provided a locked time switch 53 attached to the cargo pack 14, as by retention by one strap 28 of the sling 29, (Figure 8) this switch being constructed, for example, as in Figure 20. Time switch 53 comprises contacts 54 and 55 which form a series connection through terminals 56, 57 with switch 18. Contacts 54 and 55 normally form a closed circuit whereby the positive lead from switch 18 will be complete (lead 79, Figure 17), but are retained abnormally as an open circuit by a lock-bar 58 which embraces the enlarged head of a spring pressed contact plunger 59, spring 60 acting to urge plunger 59 into contact with contacts 54 and 55 when lock-bar 58 is removed. Lanyard 51 has an extension 62 connected to the lock-bar 58, and upon operation of lanyard 51 to withdraw pins 32 and 39, lock-bar 58 is bodily removed to permit a closed circuit through contacts 54, 55 and plunger 59.

In order, however, that the contacting of plunger 59 with contacts 54, 55 shall not be instantaneous when lock-bar 58 is pulled, whereby the shock of such stress might still tend to operate switch 18, the spring 60 acts against a hydraulic brake to form a delayed action to which end a plunger 64 forming the other end of plunger 59 acts in a cylinder 65 against a volume of air 66, which is exhausted slowly through a bleed-valve 67. Thus, after the initial launching of the loaded parachute, no premature action of the power arresting means can take place because of delayed action on time switch 53.

In order that the ground switch 18 may be substantially vertically depending from load 14, as the load descends, there is provided an aerodynamic stabilizer identified as 21 in Figures 1 and 2, which is preferably adapted to be stored in canister 27 and automatically extended during descent to serve its purpose.

In Figures 14, 15 and 16 the details of a suitable stabilizer, according to this invention, are shown. Switch 18 is attached to the lower end thereof by means of its bale 34, in any desired manner. The structure of the device 21 comprises a plurality of arms 70, arranged in the form of an inverted pyramid, the arms, shown four in number, carrying a suitable envelope such as nylon cloth 71. Each arm 70 is pivoted at its lower end to a platform 72 to which is attached at the corners thereof angle plates 73 which are drilled to serve as bearings for the pivot pins 74 around which arms 70 swing. Each arm 70 is drilled at its lower end to accommodate pivot pin 74 and is resiliently urged into open position as in Figure 14 by a coil spring 75 with each end 77 locked against platform 72 and arranged around pivot pin 74, each spring 75 having a center U-shaped extension 76 in contact with its arm 70, as shown in Figures 15 and 16, to cause spring pressure on each arm by each spring 75 when the device 21 is in closed position of Figure 16, at which time it is conveniently stowed in canister 27. Upon release of the device 21 by gravity pull of switch 18 when lock-pin 32 has been displaced by lanyard 51, the springs 75 will act on arms 70 to quickly open the damper device 21 to the position of Figure 14, and will continue to oppose closing of any arm 70 by currents of air or similar pressure during descent of the parachute supported load. The switch 18 is conveniently attached to the platform 72 by the cable 19 of Figure 17, which may be the electric lead from the switch leading to the power unit 16. To this end, the electric cable 77 comprises two leads 78 and 79, lead 78 being attached as by soldering to the bale 34 of switch 18 to form a common return or leg, and the other lead 79, which is preferably the positive lead being connected to terminal 80 on top of switch 19. Lead 79 passes to time switch 53 (Figure 8) to be then split for time control of the circuit as hereinbefore described, joining terminal 56 of switch 53, and the circuit is completed by lead 45 connected to terminal 57 and following with bridle 43 into canister 36 to join terminal 143 of Figures 9 and 11. The cable 77 is knotted or looped as at 81 around bale 34 and thence passes through an aperture 82 in platform 72 to be again knotted, as at 83, above the aperture whereby the switch 18 will be flexibly swung from platform 72, without any pull being exerted on the electrical connections of leads 78 and 79. Due to this arrangement, as the switch 18 swings to and fro on its long cable 19 of Figure 1, which is now electric cable 77 of Figures 14, 15 and 16, the pilot chute 21 comprising a damper will turn into the direction of movement of the swinging switch and offer a dampening resistance to movement so that switch 18 will be quickly brought to a relatively vertical hanging position and maintained there. This prevents accidental premature operation of the power means in power unit 16 and maintains the predetermined time of operation of this power means which is a function of the length of cable 19, or the distance which switch 18 depends below the load 14.

It is a further feature of the present invention that the switch 18 is adapted to operate on contact with the ground immediately despite any irregularities in ground contour which might exist. To this end, switch 18 comprises an outer cylindrical casing 85 accommodating therewithin batteries 86 of the usual flashlight type arranged in series. Cylinder 85 is swung in bale 34 and is of conducting material to form part of the common leg of the electric circuit of the whole arresting device. Terminal 80 forming the positive side of the circuit communicates with a metal contact spring 87 by means of a plate 88 carried by an insulating block 89 in the upper end of casing 85. At the lower end of casing 85 there is an enlarged section 90 in which is carried an insulating block 91 through which passes, and in which is entrenched, a metal contact pin 92 having its upper end communicating with pole 93 of the lower battery 86. The lower end of pin 92 terminates in a threaded portion 94 on which is mounted an annular plate 95 by nuts 96 and 97, the upper nut 97 being of plano-convex shape with the convex face away from plate 95. Loosely standing on plate 95 is a sleeve 98 having an upper flange 99, the outside diameter of the sleeve 98 being less than the diameter of annular plate 95 whereby it will be retained by gravity thereon and cannot be removed from the pin 92 which it surrounds without removing nuts 96 and the plate 95. However, sleeve 98 can tip upon plate 95 and is only limited by pin 92 the convex face of nut 97 permitting free tipping. The purpose of sleeve 98 is to retain in place tilting head cap 100 also formed of metal which comprises a main section 101 of larger diameter than that of extension 90 of cylinder 85 leaving a surrounding area 102 therebetween. Section 101 terminates in an orifice 103 for permitting nut 96 to be screwed onto and removed from threaded portion 94 of pin 92 when cap 100 is held in position by plate 95, sleeve 98, and a cooperating cylindrical cup 104 formed integrally with and internal of cap 100 and supported by an annular rib 105 formed with or attached to the inside of cap 100. Cup 104 is orificed at 106 to accommodate pin 92 passing freely therethrough and flange 99 of sleeve 98 bears against the inside face of cup 104 surrounding orifice 106 in the normal position of the switch, as shown in Figure 17, which is prior to contact with the landing area of the switch 18. In order to normally preserve the relative arrangement of parts as in Figure 17, a coil tension spring 107 surrounds cup 104 and extends between rib 105 and a metal plate 108 supported within the insulated portion 91 in section 90 of cylinder 85.

Thus, in the position of Figure 17 the cap 100 is centered with respect to pin 9 and is held in place by sleeve 98 holding up cup 104, the spring 107 being sufficiently strong to obviate deviation from this relative arrangement except under pressure caused by the weight of the whole switch unit 18. As the switch 18 approaches the ground 20 (Figures 1 and 2) it will be as in Figure 17 and if the landing point is flat the contact of the cap or tilting head 100 therewith will push the head 100 bodily upward against the action of spring 107 until rib 105 contacts the lower part 110 of the section 90, which is screw threaded thereon by cooperating threads 111. This causes a completion of the circuit through leads 78 and 79 from batteries 86 by means of pin 92, plate 95, sleeve 98, cup 104 and rib 105 through to the common side of the circuit formed by cylinder 85.

If, however, the landing area is irregular, side pressure on cap 100 will still cause this contact, and in Figures 18 and 19 two views of such contact are shown. In Figure 18, side pressure as at arrow A causes the contact at point B between the two parts of the circuit, this showing the effect of a completely lateral push as at A on either side of cap 100. Sleeve 98 has tipped to still maintain the contact between pin 92, plate 95 and cup 104, the convex face of nut 97 readily permitting this without obstruction.

In Figure 19, the effect of an angular pressure as in direction of the arrow C causing contact between the vital parts at D, the sleeve 98 still maintaining the necessary contact to cause a circuit to be completed.

Preferably, a rubber bumper 112 is provided surrounding cap 100 to absorb some of the shock of contact with the ground at angular positions as in Figures 18 and 19 to prevent damage to the cap 100. Thus, the tilting head cap 100 permits accurate and immediate actuation of the switching elements of switch 18, even when the landing area or point is irregular.

In accordance with the present invention, there is provided a power unit 16 which includes preferably means for utilizing the explosive force of a cartridge or like explosive unit to cause application of power, for the purpose herein defined.

The power unit according to the illustrated embodiment of the invention is shown in Figures 9-13 and comprises an outside protective canister 36 (Figure 8) within which are means for reducing the effective length of riser 15.

As previously described, riser 15 passes through guide 46 mounted on a crossbar 47 fixed at the top of canister 36. It passes through this guide and thence through an elongated collar 120 formed as part of a head 121 fast within a cylinder 122, as by screw threads 123. Head 121 has three flanged sections 124 each adapted to mount a pulley 125 within a bearing bracket 126 by pivots 127. Cylinder 122 terminates short of canister 36 and has within its body slidably mounted a tube 128 adapted to act as a piston and hereinafter called piston 128. Piston 128 has a head 129 at its free end or lower end formed similar to head 121 with three flanges 130 each supporting a pulley 131 in a bracket 132, on a pivot pin 133.

As better shown by comparing Figures 12 and 13, pulleys 125 are displaced circumferentially from pulleys 131, whereby riser 15 passing through guide 46 and collar 120 passes with a first reach 134 to a lower pulley 131, thence up to a pulley 125 in a reach 135, thence down to another pulley 131 by a reach 136 and so on, forming a series arrangement of pulleys 131 and 125, the riser finally being formed as a reach 138 shown as terminating in a ring 139, the bridle 43 supporting load 14, being attached thereto. Since piston 128 slides within cylinder 122, the normal position of the power operating means will be as in Figures 9 and 11, with the piston fully inserted within its cylinder. In order to apply a force to the piston to displace this away from the cylinder, a suitable cartridge 140 having an explosive charge is inserted in the lower end of piston 128 in contact with a firing pin 141 contacting the firing center of the cartridge and pin 141 terminates in an electric contact 142 to which a terminal 143 connected to lead 45 (Figure 8) is attached. Since lead 45 is connected to positive lead 79 (Figure 17) through time switch 53, when ground switch 18 is operated to supply a source of electrical energy through lead 79, cartridge 140 will be detonated, the common leg or side of the circuit being made by connecting all metal parts of the apparatus as a whole to lead 78 (Figure 17), and to the shackle 44 (Figure 8) as shown at 115. Upon detonation, the piston 128 will be projected outwardly from its cylinder 122 and thus will cause the pulleys 131 to move away from pulleys 125, thus pulling in or taking up the length of the riser 15, as generally shown in Figure 2. Since the load cannot be lifted by the force of the explosion of cartridge 140, due to the high inertia of the downward travelling cargo, the parachute 10 will be pulled down, this having less resistance and having the applied force of the explosion acting in its direction of movement already established, whereas the force must act against the direction of movement of the load. Thus the condition shown in Figure 2 will be established upon firing the cartridge 140 by ground switch 18.

By the construction of Figures 9-13, a small explosive force causes a large relative movement of the parachute 10 and the load 14, by reason of the multiple series of reaches of the pulley system disclosed, the purpose of the pulleys being to reduce the size of piston and cylinder for a given stroke for movements of the parachute relative to the load, thus permitting a compact construction of light weight.

In order to permit exhausting the gases under pressure, ports 145 are provided in cylinder 122, these communicating with the interior of piston 128 when it is fully extended or forced out of its cylinder.

Since the detonating of the cartridge causes an instantaneous force which is immediately transmitted to the piston and cylinder unit, the load 14 may momentarily be reduced to substantially zero velocity, but as the load will tend to continue to fall, by the time the system is ready to readjust itself to normal conditions of descent, the load will have been deposited on the landing area. In actual practice, the load may be deposited in as little as $\frac{1}{16}$ths of a second after detonation of the cartridge 140, by correct preselection of load, parachute size, cartridge size and type and length of cable 19 (Figures 1 and 2) supporting switch 18. Normally, therefore, the load 14 will have been deposited before there is any actual movement tending to shorten the distance between pulleys 125 and 131, thus lengthening riser 15 again but if desired, a one way gripper 150 may be incorporated as part of collar 120 which acts to prevent the reach 134 of riser 15 from running back through guide 46, this gripper being of conventional design for such purpose.

The invention in its broader aspects is not limited to the specific mechanisms shown and described but departures may be made therefrom within the scope of the accompanying claims without departing from the principles of the invention and without sacrificing its chief advantages.

What is claimed is:

1. The combination with a parachute supported load, of means for arresting the velocity of descent of said load, means for automatically operating said arresting means at a preselected point in the path of descent of said load, means carried by said load adapted to be actuated by the parachute for releasably securing said arresting means and said operating means directly to said load in inoperative condition prior to attaching same to a parachute for descent, said securing means being automatically released and said arresting means and said operating means being automatically placed in condition for operation upon launching of the parachute supported load.

2. A descent arrester for a parachute supported load comprising in combination a power unit placed between the load and its supporting parachute and forming a connection therebetween, said power unit comprising expanding means for suddenly reducing the distance between the load and the parachute, power means for creating a surge of energy, to effect a relatively small stroke of said expanding means, means for multiplying the effect of said stroke to cause a relatively large reduction of said distance, and control means for operating said power means.

3. A descent arrester for a parachute supported load comprising in combination a power unit placed between the load and its supporting parachute and forming a connection therebetween, said power unit comprising expanding means for suddenly reducing the distance between the load and the parachute, power means for creating a surge of energy, to effect a relatively small stroke of said expanding means, means for multiplying the effect of said stroke to cause a relatively large reduction of said distance, and control means for operating said power means to cause said reducing of distance, said operating means comprising an electric ground contacting switch depending below the load a preselected distance and acting by impact upon contact with the ground to operate said power means, whereby said load is deposited on the ground at substantially zero velocity.

4. A descent arrester for a parachute supported load comprising in combination a power unit placed between the load and its supporting parachute and forming a connection therebetween, said power unit comprising expanding means for suddenly reducing the distance between the load and the parachute, power means for creating a predetermined and calculated surge of energy to effect a predetermined and relatively small calculated stroke of said expanding means, means for multiplying the effect of said stroke by a predetermined amount to produce a calculated relatively large reduction of said distance, whereby the load will be deposited on the landing surface at substantially zero velocity.

5. A descent arrester for a parachute supported load comprising in combination a power unit placed between the load and its supporting parachute, said power unit comprising a cylinder and a piston operable on a single stroke by a pressure differential created therebetween to reduce the distance between the load and the parachute, power means for creating a surge of energy, and control means for operating said power means to cause said reducing of distance, said operating means comprising an electric ground contacting switch depending below the load a preselected distance and acting by impact upon contact with the ground to operate said power means, whereby said load is deposited on the ground at substantially zero velocity.

6. The combination with a load supported by a parachute by means of a riser, of power means for suddenly reducing the effective length of said riser, and control means for operating said power means at a preselected point above the landing surface for the load, whereby to land said load on said surface at substantially zero velocity, said power means including a cylinder and piston operable on a single stroke by a pressure differential created therebetween to reduce the effective length of said riser.

7. The combination with a load supported by a parachute by means of a riser, of power means for suddenly reducing the effective length of said riser, and control means for operating said power means at a preselected point above the landing surface for the load, whereby to land said load on said surface at substantially zero velocity, said power means including a cylinder and piston operable on a single stroke by a pressure differential created therebetween to reduce the effective length of said riser by means of a plurality of pulleys in a series of reaches, said pulleys moving apart under said single stroke to increase the length of the reaches and thereby reduce the effective length of the riser.

8. The combination with a load supported by a parachute by means of a riser, of power means for suddenly reducing the effective length of said riser and control means for operating said power means at a preselected point above the landing surface for the load, whereby to land said load on said surface at substantially zero velocity, said power means including a cylinder and piston operable on a single stroke by a pressure differential created therebetween to reduce the effective length of said riser, the pressure differential being created by a small explosive force applied to the piston.

9. The combination with a load supported by a parachute by means of a riser, of power means for suddenly reducing the effective length of said riser, and control means for operating said power means at a preselected point above the landing surface for the load, whereby to land said load on said surface at substantially zero velocity, said power means including a cylinder and piston operable on a single stroke by a pressure differential created therebetween to reduce the effective length of said riser, the said single stroke being relatively short compared to the effective reduction of length of the riser, and means being provided between the piston and cylinder for multiplying the stroke to cause a large effective reduction of length of the riser.

10. The combination with a load supported by a parachute by means of a riser, of power means for suddenly reducing the effective length of said riser, and control means for operating said power means at a preselected point above the landing surface for the load, whereby to land said load on said surface at substantially zero velocity, said control means comprising a time switch and a normally operative electric ground contact switch adapted to be rendered temporarily inoperative by said time switch, to prevent premature operation of the ground switch.

11. The combination with a load supported by a parachute by means of a riser, of power means for suddenly reducing the effective length of said riser, and control means for operating said power means at a preselected point above the landing surface for the load, whereby to land said load on said surface at substantially zero velocity, said control means comprising a normally operative electric ground contact switch and a time switch, said contact switch being rendered temporarily inoperative by said time switch, to prevent premature operation of the contact switch, means for locking said time switch against operation prior to the launching of the parachute supported load from its airborne carrier, and means connected to said riser for releasing said locking means automatically upon launching of the parachute.

12. The combination with a load supported by parachute by means of a riser, of power means for suddenly reducing the effective length of said riser, and control means for operating said power means at a preselected point above the landing surface for the load, whereby to land said load on said surface at substantially zero velocity, said power means including a piston movable within a cylinder under urge of an electrically fired explosive charge, and a series of riser take-up means between the cylinder and piston which operate to reduce the effective length of the riser when said charge is fired to move the piston relative to the cylinder, and said control means including an electric switch depending below the load by a predetermined length of cable and operable on physical contact with the ground to fire the explosive charge, the depending switch having oscillation damping means to keep it substantially vertically depended and being operable by physical contact at any angle against the lowermost part of the switch.

13. The combination with a load supported by a parachute by means of a riser, of power means for suddenly reducing the effective length of said riser, and control means for operating said power means at a preselected point above the landing surface for the load, whereby to land said load on said surface at substantially zero velocity, said power means including a piston movable within a cylinder under urge of an electrically fired explosive charge, and a series of riser take-up means between the cylinder and piston which operate to reduce the effective length of the riser when said charge is fired to move the piston relative to the cylinder, and said control means including an electric switch depending below the load by a predetermined length of cable and operable on physical contact with the ground to fire the explosive charge, the depending switch having oscillation damping means to keep it substantially vertically depended and being operable by physical contact at any angle against the headcap of the switch, said power means and control means being each normally housed in protective canisters attached to the load prior to attaching same to the parachute riser before launching, and each part of said means being physically retained against electrical and mechanical operation while within said canisters, means being provided automatically operated from the parachute riser as it takes up the load upon launching of the parachute to place each part of the means in its operable condition and in its operable position relative to all other parts.

14. The combination with a parachute supported load, of means for arresting the velocity of descent of said load and means including a foldable aerodynamic damper and an aerodynamically damped ground switch flexibly swung therefrom a predetermined distance below the load for automatically operating said arresting means at a preselected point in the path of descent of said load.

SAMUEL DAVIS ROBINS.

REFERENCES CITED

The following references are of record in the file of this patent:

UNITED STATES PATENTS

| Number | Name | Date |
|---|---|---|
| 1,535,475 | Jeansen | Apr. 28, 1925 |
| 1,709,264 | Holt | Apr. 16, 1929 |
| 2,333,558 | Gay | Nov. 2, 1943 |
| 2,414,284 | Bacon | Jan. 14, 1947 |

FOREIGN PATENTS

| Number | Country | Date |
|---|---|---|
| 389,007 | Great Britain | Mar. 9, 1933 |
| 851,913 | France | Oct. 16, 1939 |